United States Patent [19]
Venegas, Jr.

[11] Patent Number: 5,312,089
[45] Date of Patent: May 17, 1994

[54] HANDRAIL ASSEMBLY

[75] Inventor: Frank Venegas, Jr., 4165 Homestead, Howell, Mich. 48843

[73] Assignee: Frank Venegas, Jr., Howell, Mich.

[21] Appl. No.: 938,207

[22] Filed: Aug. 28, 1992

[51] Int. Cl.$^5$ .............................. E04H 17/14
[52] U.S. Cl. ............................ 256/65; 256/19; 256/59; 403/260
[58] Field of Search .................. 256/59, 65–66, 256/72, 19, 67, 62–64, 68–71, DIG. 6, 1, 55; 403/347, 292, 260, 258

[56] References Cited

U.S. PATENT DOCUMENTS

| | | | |
|---|---|---|---|
| 1,452,875 | 4/1923 | Healy | 256/1 |
| 2,557,002 | 6/1951 | Lathrop | 256/65 |
| 2,603,455 | 7/1952 | Welch | 256/13.1 |
| 2,780,440 | 2/1957 | Krieger | 256/21 |
| 2,927,513 | 3/1960 | Dove | 256/13.1 |
| 2,946,568 | 7/1960 | Ogden | 256/65 |
| 3,080,149 | 3/1963 | Pilboue | 256/19 X |
| 3,385,617 | 5/1968 | Gehring | 403/258 |
| 3,462,126 | 8/1969 | Demanega | 256/65 |
| 3,519,292 | 7/1970 | Krikorian | 403/260 X |
| 3,776,520 | 12/1973 | Charles et al. | 256/13.1 |
| 3,921,960 | 11/1975 | Bright | 256/59 X |
| 3,957,250 | 5/1976 | Murphy | 256/19 |
| 3,963,218 | 6/1976 | Glaesener | 256/13.1 |
| 4,461,461 | 7/1984 | Caron | 256/19 |
| 4,477,059 | 10/1984 | Willis | 256/59 X |
| 4,516,756 | 5/1984 | Beatty | 256/19 |
| 4,540,160 | 9/1985 | Zanavich et al. | 256/19 |
| 4,702,459 | 10/1987 | Moschner | 256/19 |
| 4,750,713 | 6/1988 | Hirose | 256/69 |
| 4,892,292 | 1/1990 | Russell | 256/66 |
| 4,930,754 | 6/1990 | Caron et al. | 256/65 |
| 4,953,830 | 9/1990 | Weaver, III | 256/65 |
| 5,170,996 | 12/1992 | Venegas, Jr. et al. | 256/69 |

FOREIGN PATENT DOCUMENTS 1141504 1/1969 United Kingdom ............ 256/68
2011007 7/1979 United Kingdom .

OTHER PUBLICATIONS

Drawing specification for a modular rail system by the Spiratex Company, Feb. 11, 1991.

Primary Examiner—Randolph A. Reese
Assistant Examiner—Harry C. Kim
Attorney, Agent, or Firm—Gifford, Groh, Sprinkle, Patmore and Anderson

[57] ABSTRACT

The handrail assembly includes at least one tubular metal stanchion having a base and at least one aperture through both sides of the stanchion and at least a horizontal top rail extending through the stanchion aperture. The horizontal top rail has an inner metal pipe, an outer plastic pipe, and at least one aperture through both sides of the rail for receiving a metal retaining rod. Following insertion of the horizontal top rail into the stanchion aperture, the apertures of the top horizontal rail are vertically oriented so that they are aligned with the tubular metal stanchion. Following alignment of the top horizontal rail apertures, the retaining rod is fitted into the apertures. In one embodiment, the retaining rod rests in a receiving cup located on the base of the stanchion. In an alternative embodiment, the retaining rod has an end plate affixed to it where the end plate is sized to be about the interior diameter of the tubular metal stanchion. In each embodiment, the retaining rod reversibly locks the top horizontal rail in position within the stanchion. Disassemblage of the handrail assembly is facilitated by the easy pulling out of the retaining rod.

2 Claims, 2 Drawing Sheets

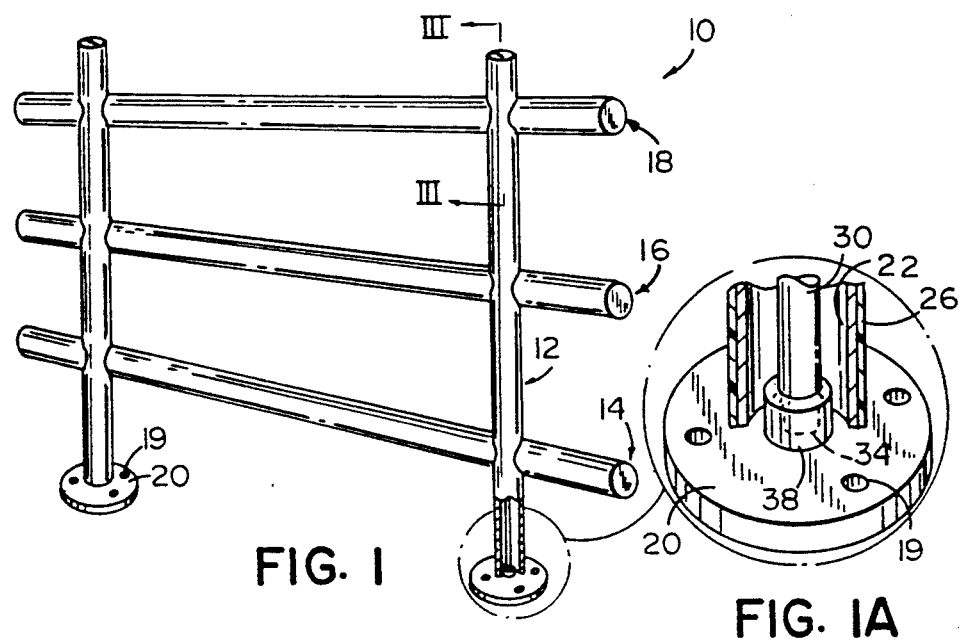
FIG. 1
FIG. 1A
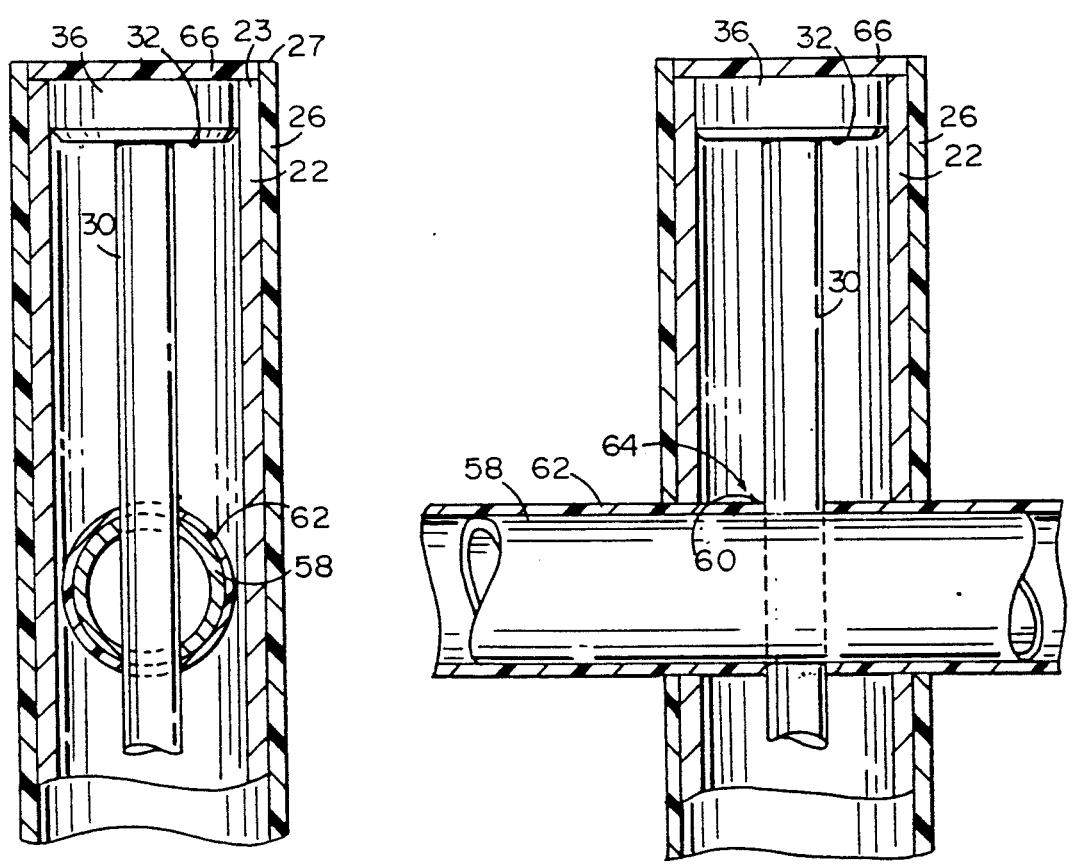
FIG. 3
FIG. 4

HANDRAIL ASSEMBLY

BACKGROUND OF THE INVENTION

This invention generally relates to a handrail and, more particularly, to a unique rigid handrail assembly which can be quickly installed, dismantled, moved and reassembled, in factories, parking lots, stadiums, stairways, porches, balconies and the like.

Steel handrails are commonly used in factories and warehouses to direct pedestrian traffic and to protect workers from being hit by forklifts or other potentially damaging objects present in factories and warehouses. Steel handrails are also commonly used as railings for balconies of apartment buildings and athletic stadiums. In general, steel handrails are used in a variety of environments where it is desirable to control movement. While steel handrails are quite strong, they also generally are quite rigid and, therefore, do not possess high energy absorbing capabilities. Another disadvantage of steel handrails is that they require maintenance because they rust. An alternative to steel handrails are plastic handrails which, as compared with steel handrails, can be energy absorbing, are low maintenance, and also have the advantage of being easily color-coded. Unfortunately, plastic handrails do not provide the same strength that is a desirable characteristic of steel handrails. Therefore, it would be highly desirable to have available handrails which combine the respective desirable characteristics of plastic and steel handrails.

A common drawback to many currently available steel, plastic or steel/plastic handrail assemblies is that once they are assembled in one place, they essentially become fixtures in that location. Hence, although such handrail assemblies are common, they are not easily removed from one location and reassembled in another location. As a result, there exists a need for an improved handrail assembly which combines the desirable characteristics of plastic and steel handrail assemblies, yet allows the ready assemblage and disassemblage of such a handrail assembly.

SUMMARY OF THE INVENTION

The present invention provides a knockdown rail assembly which is readily and easily assembled and disassembled. The rail assembly includes a vertical stanchion having at least one aperture through both sides of the stanchion defined therein, and at least one horizontal, tubular rail having an aperture through both sides of the rail defined therein where the rail is extended into the stanchion aperture. A retainer means in the stanchion retains the rail within the stanchion.

In a preferred embodiment, the present invention is a handrail assembly which includes at least one vertically oriented support stanchion, the stanchion having an outer plastic sheath and a tubular metal post, at least one aperture through both sides of the stanchion such that the apertures align with each other, and a base where a lower end of the post is anchored to the base, and at least one horizontal rail having an outer plastic pipe and an inner metal pipe and at least one aperture through both sides of the rail such that the apertures align with each other. Following the slipping of the plastic sheath over the tubular metal post and the outer plastic pipe over the inner metal pipe, the horizontal rail is extended through the stanchion aperture to a point where the rail apertures are positioned within the interior of the stanchion. The rail is then turned so that the rail apertures are vertically oriented within the stanchion. A retaining rod is then inserted into the tubular metal post of the stanchion and is fitted into the horizontal rail aperture. In one embodiment, the retaining rod runs the length of the stanchion and rests on the base of the tubular metal post. In an alternate embodiment, the retaining rod runs the length of the stanchion and rests in a receiving cup which is fixed to the base of the tubular metal post. In a further alternative embodiment, an end plate is fixed to the retaining rod where the end plate has a dimension which is slightly greater than the inner dimension of the tubular metal post. Following insertion of the retaining rod into the rail aperture, the end plate rests on the tubular metal post and supports the retaining rod. The handrail assembly is disassembled by removing the retaining rod from the stanchion and removing the above components. In other embodiments, a plurality of stanchions, sheaths and horizontal rails can be used. These and other objects, advantages and features of this invention will become apparent upon review of the following specification in conjunction with the drawings.

BRIEF DESCRIPTION OF THE FIGURES

FIG. 1 is a perspective view of the handrail assembly of the present invention;

FIG. 1a is a fragmentary cross-sectional view showing the locking mechanism of the present invention;

FIG. 3 is a fragmentary cross-sectional view showing the locking mechanism of the present invention taken along the lines III—III in FIG. 1; and FIG. 4 is a fragmentary cross-sectional view showing the locking mechanism of the present invention.

DETAILED DESCRIPTION OF THE PREFERRED EMBODIMENTS

Figure 2:
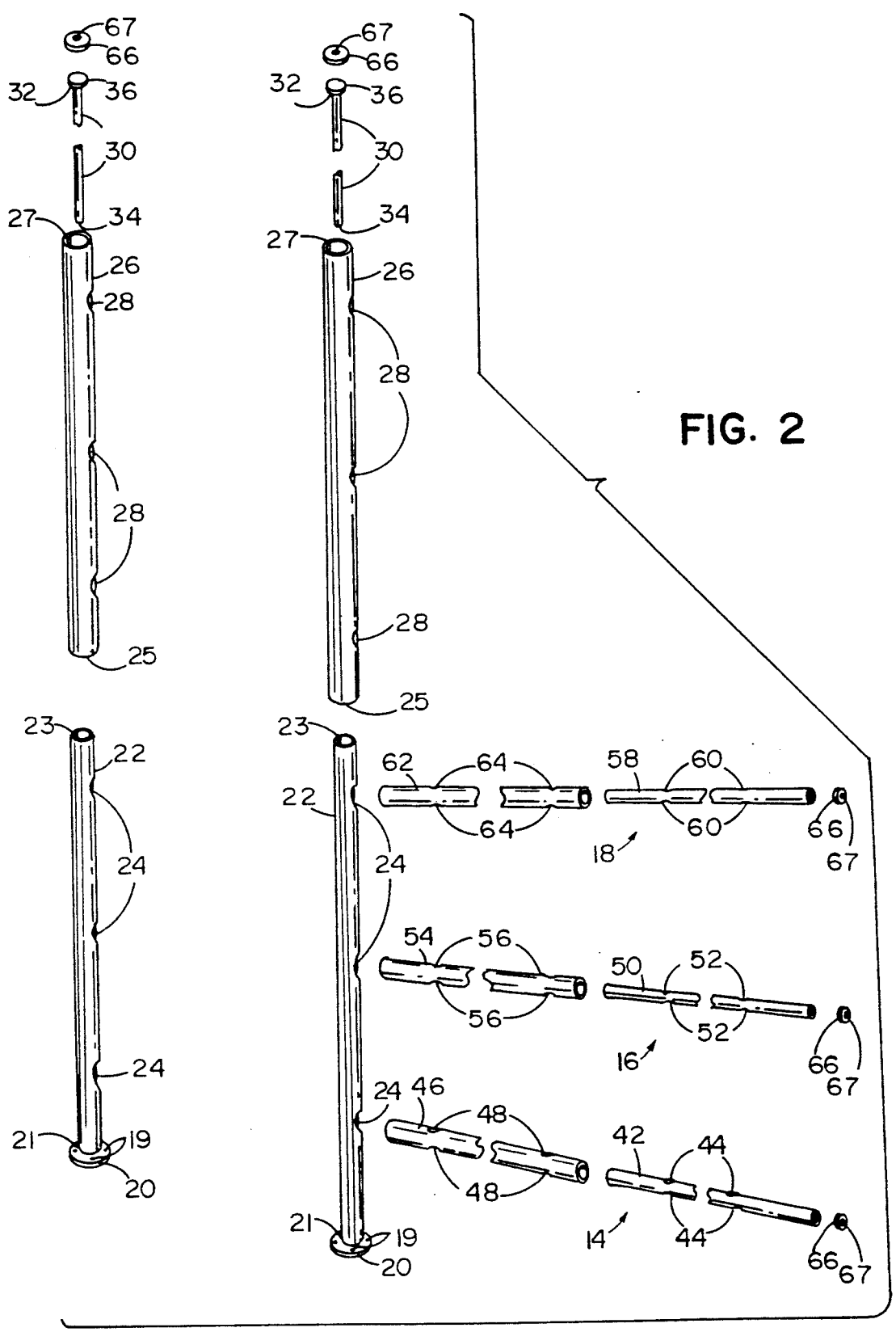
FIG. 2 is an exploded view of the handrail assembly of the present invention.

Referring now to the drawings and the embodiments illustrated therein, in which like numerals indicate like parts throughout the several views, FIG. 1 shows a handrail assembly 10 including a plurality of upright stanchions 12, a first horizontal rail 14, a second horizontal rail 16 and a top horizontal rail 18. As shown in FIG. 2, the plurality of upright stanchions 12 each include a base 20, a tubular metal post 22 having a lower end 21, an upper end 23, and a plurality of apertures 24, and a tubular sheath 26 having a plurality of apertures 28. As also shown in FIG. 2, first horizontal rail 14 includes a first metal pipe 42 having a plurality of apertures 44, and a first plastic pipe 46 having a plurality of apertures 48. Second horizontal rail 16 includes a second metal pipe 50 having a plurality of apertures 52, and a second plastic pipe 54 having a plurality of apertures 56. Top horizontal rail 18 includes a top metal pipe 58 having a plurality of apertures 60 and a top plastic pipe 62 having a plurality of apertures 64.

As shown in FIGS. 2 and 3, a retaining rod 30 having a first end 32 and a second end 34 is fitted through the respective apertures of horizontal rails 14, 16 and 18. Retaining rod 30 is held in position in handrail assembly 10 by the attachment of an end plate 36 to first end 32 of retaining rod 30 where end plate 36 is sized to conform with the interior diameter of metal post 22. To further assist the holding in position in handrail assembly 10 of retaining rod 30, a receiving cup 38 is positioned in the center of base 20 for receiving second end 34 of retaining rod 30.

With reference to FIGS. 2 and 3, handrail assembly 10 is assembled by sliding tubular sheath 26 onto post 22 and aligning the plurality of apertures 24 of post 22 with the plurality of apertures 28 of sheath 26 to form stanchion 12. Sheath 26 has a first end 25 conforming with base 20, a flat second end 27 and has interior dimensions which are greater than or equal to the exterior dimensions of post 22. After sheath 26 is slid onto post 22, first end 25 rests on base 20 and apertures have been formed for the reception of horizontal rails 14, 16 and 18.

First horizontal rail 14 is formed by locating first metal pipe 42 in first plastic pipe 46. The plurality of apertures 44 of first metal pipe 42 are aligned with the plurality of apertures 48 of first plastic pipe 46 to allow the fitting of retaining rod 30 through the aligned apertures. First horizontal rail 14 is then fitted into the lowest aperture of stanchion 12. After placement of first horizontal rail 14 into stanchion 12, retaining rod 30 is temporarily inserted into the aligned apertures 44 and 48 of first horizontal rail 14 to properly position first horizontal rail 14 in stanchion 12.

Second horizontal rail 14 is formed by locating second metal pipe 50 in second plastic pipe 54. The plurality of apertures 52 of second metal pipe 50 are aligned with the plurality of apertures 56 of second plastic pipe 54 to allow the fitting of retaining rod 30 through the aligned apertures. Second horizontal rail 16 is then fitted into the middle aperture of stanchion 12. After placement of second horizontal rail 16 into stanchion 12, retaining rod 30 is temporarily inserted into the aligned apertures 52 and 56 of second horizontal rail 16 and into the aligned apertures 44 and 48 of first horizontal rail 14 to properly position first horizontal rail 14 and second horizontal rail 16 in stanchion 12.

Top metal pipe 58 is then inserted into top plastic pipe 62 to form top horizontal rail 18. The plurality of apertures 60 of top metal pipe 58 are then aligned with the plurality of apertures 64 of top plastic pipe 62 to allow the fitting of retaining rod 30 through the aligned apertures. Top horizontal rail 18 is then fitted into the top aperture of stanchion 12. After placement of top horizontal rail 18 into stanchion 12, retaining rod 30 is inserted into the aligned apertures 60 and 64 of top horizontal rail 18, the aligned apertures 52 and 56 of second horizontal rail 16, and aligned apertures 44 and 48 of first horizontal rail 14. End plate 36 of retaining rod 30 is then fitted into the interior of metal post 22 and second end 34 of retaining rod 30 is inserted into receiving cup 38 to lock reversibly the three horizontal rails in proper position. Receiving cup 38 can be threaded or unthreaded. If receiving cup 38 is threaded, then second end 34 of retaining rod 30 also is threaded and is threaded into the receiving cup 38 by rotating retaining rod 30 in a clockwise fashion. A plurality of endcaps 66 then may be used to cover the open ends of first horizontal rail 14, second horizontal rail 16, top horizontal rail 18 and stanchions 12.

It is not essential that retaining rod 30 be long enough to be received by receiving cup 38. While such a length of retaining rod 30 is preferred, it is only necessary that retaining rod 30 be long enough to pass entirely through first horizontal rail 14. If retaining rod 30 is not long enough to pass entirely through first horizontal rail 14, there is some risk that first horizontal rail 14 will wobble. Because handrails are expected to be rigid, it is important that retaining rod 30 be long enough not to allow the first horizontal rail 14 the opportunity to move slightly or "give" upon being struck by an object or grabbed, for example, by a human hand. The locking mechanism of the present invention provides that rigidity.

In the preferred embodiment of the present invention, first plastic pipe 46, second plastic pipe 54, top plastic pipe 62 and tubular sheath 26 are slightly longer than their respective inserts, first metal pipe 42, second metal pipe 50, top metal pipe 58 and tubular metal post 22. The resulting overlap of first plastic pipe 46, second plastic pipe 54, top plastic pipe 62 and tubular sheath 26 over first metal pipe 42, second metal pipe 50, top metal pipe 58 and tubular metal post 22 creates a space at the end of first horizontal rail 14, second horizontal rail 16, top horizontal rail 18 and stanchion 12 to receive endcaps 66. Because endcaps 66 are sized essentially to equal the interior dimensions of first plastic pipe 46, second plastic pipe 54, top plastic pipe 62 and tubular sheath 26, endcaps 66 can be fitted to that space. Endcaps contain an endcap aperture 67 to facilitate their removal.

Following the assemblage of handrail assembly 10, base 20 of stanchion 12 is bolted into the ground, i.e., concrete, with a plurality of bolts 19. The preferred expandable bolt for the installation is the RAWL-BOLT ™ available from The Rawl Plug Company, Inc., Two F. B. Powers Square, New Rochelle, N.Y. Installation involves the use of a hammer drill to drill holes in the concrete. Base 20 is then positioned over the holes and expandable bolts 19 are then driven into the holes by the hammer drill. A crescent or socket wrench is then used to tighten bolts 19. Following the proper positioning of tubular metal post 22, handrail assembly 10 can be assembled.

Handrail assembly 10 of the present invention is strong enough to become a permanent fixture where it is erected. There are instances, however, when it would be beneficial to be able to move or remove all or part of the handrail. Removal of the present handrail assembly 10 simply involves the reversal of the above-listed assemblage steps. Specifically, stanchion base 20 is removed by untightening bolts 19 which are holding base 20 in the ground. Endcaps 66, if present, are pried loose and retaining rod 30 is removed from post 22. Top horizontal rail 18, second horizontal rail 16, first horizontal rail 14 and stanchion 12 can then be quickly and easily removed. These parts can then be moved to another location where handrail assembly 10 can be reassembled quickly and easily. The only new parts required are the expandable bolts 19. Where repair of a portion of handrail assembly 10 is required, the knockdown characteristics of the present invention facilitate the quick and easy maintenance of the damaged portion without removal of the expandable bolts 19. All that is required is removal of the endcaps 66 present in sheath 26 and removal of retaining rod 30 to obtain access to top horizontal rail 18, second horizontal rail 16 and first horizontal rail 14.

With respect to the preferred materials for use in the present invention, it is preferred that the first, second and top plastic pipes and the plastic sheath be formed from high density polyethylene although other plastic materials may be used. Regarding the first, second and top metal pipes, the retaining rod and end plate, the receiving cup and the stanchion posts and bases, it is preferred that they be formed from a metal selected from the group including steel, aluminum, and iron.

The above description is considered that of the preferred embodiment only. Modifications of the invention may occur to those of ordinary skill in the art. Therefore, it is understood that the embodiment shown in the drawings and described above is merely for illustrative purposes and is not intended to limit the scope of the invention, which is defined by the following claims as interpreted according to the principles of patent law.

I claim:

1. A knockdown handrail assembly comprising:

at least one vertically oriented support stanchion having a hollow interior, said stanchion including a tubular plastic sheath and a tubular metal post defining an open upper end, said tubular plastic sheath having an inside dimension and an outside dimension, said tubular metal post having an outside dimension less than or equal to said inside dimension of said tubular plastic sheath, said tubular plastic sheath having at least one aperture thorough both sides of said tubular plastic sheath, said tubular metal post having at least one aperture through both sides of said tubular metal post, said tubular metal post being located in said tubular plastic sheath such that said apertures in said tubular plastic sheath and said tubular metal post align with each other, said stanchion further including a base at a lower end thereof and a receiving cup on said base, said receiving cup opening into said metal post;

a top horizontal rail having a top plastic pipe and a top metal pipe, said top plastic pipe having an inside dimension and an outside dimension, said top metal pipe having an outside dimension less than or equal to said inside dimension of said top plastic pipe, said top plastic pipe having at least one aperture through both sides of said top plastic pipe, said top metal pipe having at least one aperture through both sides of said top metal pipe, said top metal pipe being located in said top plastic pipe such that said apertures in said respective pipes align with each other, said top horizontal rail extending through said aperture of said stanchion whereby said aligned apertures of said top horizontal rail are vertically oriented within said stanchion after placement of said rail in said stanchion;

a retaining rod positioned within said stanchion, said retaining rod having an upper end and a lower end, said retaining rod being removably fitted into said aligned apertures of said horizontal rail with said lower end disposed within said receiving cup, whereby said retaining rod maintains said top horizontal rail in position in said stanchion and remains accessible from outside said rail assembly through said upper end and said hollow interior of said stanchion for easy removal of said retaining rod after placement of said retaining rod in said stanchion and fitting of said retaining rod into said aligned apertures and without removal of said top horizontal rail;

an end plate fixed to said upper end of said retaining rod, said end plate dimensioned to fit the interior of said stanchion; and an end cap disposed within and covering the open upper end of said stanchion.

2. A knockdown handrail assembly as defined by claim 1 wherein said tubular plastic sheath and said tubular metal post of said stanchion define another apertures through both sides of said tubular plastic sheath and said tubular metal post which align with each other and wherein said assembly further comprises:

another horizontal rail having another plastic pipe and another metal pipe, said another plastic pipe having an inside dimension and an outside dimension, said another metal pipe having an outside dimension less than or equal to said inside dimension of said another plastic pipe, said another plastic pipe having at least one aperture through both sides of said another plastic pipe, said another metal pipe having at least one aperture through both sides of said another metal pipe, said another metal pipe being located in said another plastic pipe such that said apertures in said respective another pipes align with each other, said another horizontal rail extending through said another apertures of said stanchion whereby said aligned apertures of said another horizontal rail are vertically oriented within said stanchion after placement of said rail in said stanchion.

* * * * *